Nov. 6, 1934.  J. C. WOODFORD  1,980,148
FLUID DISPENSING APPARATUS
Filed Nov. 6, 1930  2 Sheets-Sheet 1
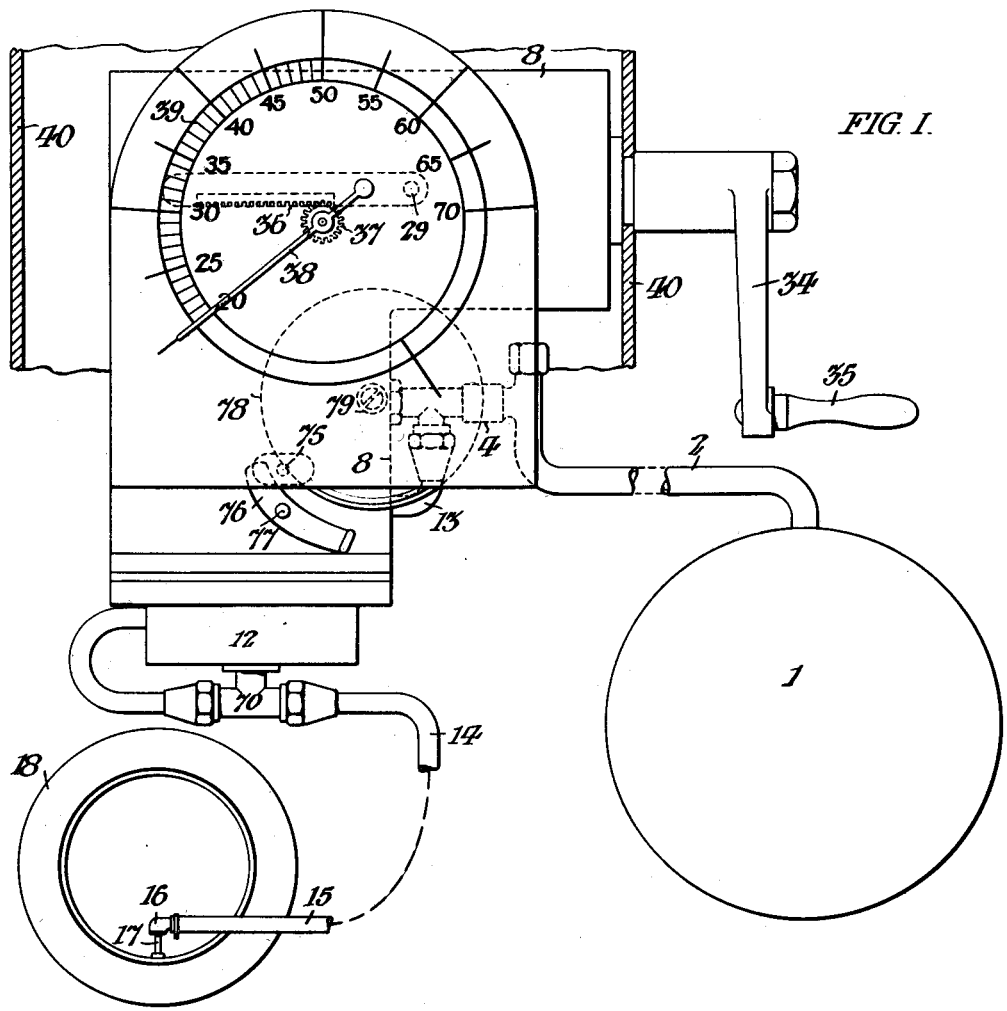
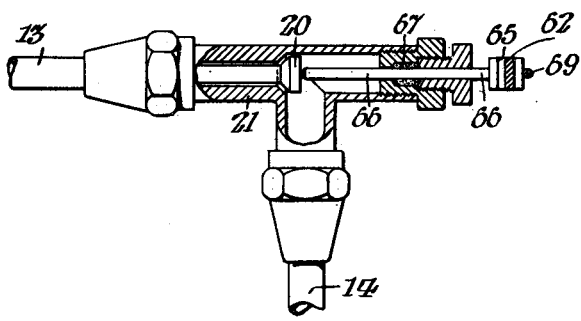
INVENTOR:
JOSEPH C. WOODFORD,
BY Nov. 6, 1934.     J. C. WOODFORD     1,980,148
FLUID DISPENSING APPARATUS
Filed Nov. 6, 1930     2 Sheets-Sheet 2
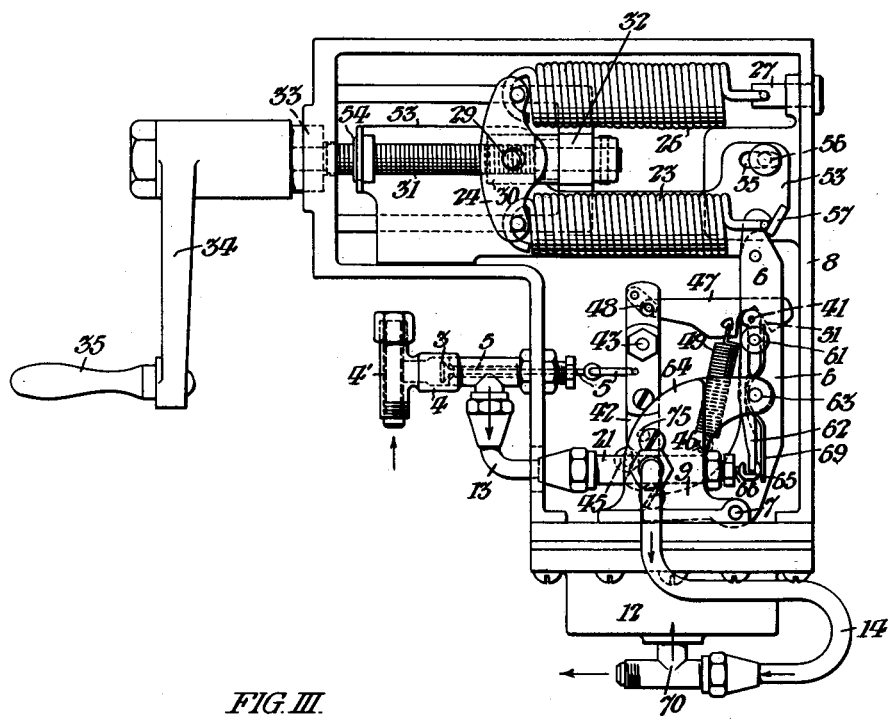
FIG. II.
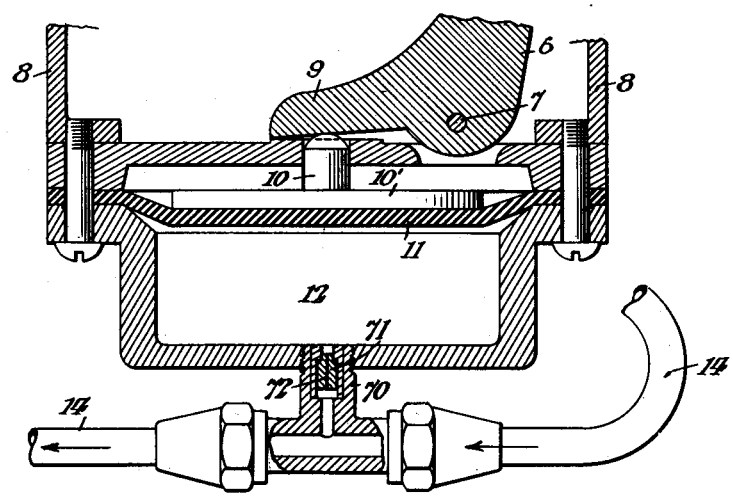
FIG. III.
INVENTOR:
JOSEPH C. WOODFORD, Patented Nov. 6, 1934

1,980,148

UNITED STATES PATENT OFFICE 1,980,148

FLUID DISPENSING APPARATUS

Joseph C. Woodford, Ardmore, Pa., assignor to Service Station Equipment Company, Conshohocken, Pa., a corporation of Delaware Application November 6, 1930, Serial No. 493,776

9 Claims. (Cl. 50—5)

My invention may be advantageously employed in apparatus for dispensing atmospheric air under pressure to inflate pneumatic vehicle tires and is particularly applicable to such tire inflating apparatus wherein the degree of pressure of the air dispensed may be predetermined by adjustment of controlling mechanism including a valve controlled by a diaphragm subjected to the pressure of the air dispensed, when the back pressure with respect to the tire reaches the predetermined degree.

Although such apparatus is designed to be automatically operative as aforesaid; it has been found in practice that under certain conditions it becomes inoperative and permits a tire to be inflated to a detrimental degree in excess of that for which the apparatus is set. Therefore, it is an object and effect of my invention to provide such dispensing apparatus including such a diaphragm controlled main valve, but with an auxiliary valve in cooperative relation therewith which acts as a safety valve to limit the degree of pressure of the air dispensed, by closing the conduit between the supply of compressed air and the tire, regardless of whether the diaphragm valve is closed or not.

As ordinarily constructed, such diaphragm controlled apparatus of the prior art includes but a single spring opposed to the pressure on the diaphragm. An adjunctive feature of my invention is the provision of two springs coupled so that they may be both stressed simultaneously to a variable degree with a minimum amount of manual operation, but so that, as thus coupled, in parallel relation, they act as a single long spring but may be mounted in a casing smaller than would be required for an equivalent single spring, with the effect of attaining a greater degree of adjustability and greater facility of adjustment of the apparatus for rapidly dispensing fluid at different pressures.

The apparatus hereinafter described is adapted to dispense air from a container in which it is stored at high pressure, say, one hundred and fifty pounds per square inch, to inflate vehicle tires to from thirty pounds per square inch to the maximum pressure in the container. Theoretically, such dispensation might be effected through an ordinary pressure reducing valve local to the container. However, it is characteristic of such an arrangement that the dispensing conduits terminating in a flexible hose with a valve coupling at its end for engagement with the tire valve stem, are entirely charged with air to only the maximum pressure to which it is desired to inflate the tire and, consequently, the rate of inflation rapidly diminishes as the pressure in the tire approaches that in said dispensing conduits, and, therefore, the average rate of inflation is thus reduced to an undesirable degree. On the contrary, it is characteristic of the apparatus chosen for illustration of my invention that the dispensing conduit immediately adjoining the tire is, throughout each inflating operation, continuously charged with air at an average pressure considerably in excess of the maximum pressure desired in the tire but, nevertheless, the inflating operation is instantly automatically terminated when the desired lower pressure is attained in the tire and, therefore, the inflation is effected at a higher rate than is possible with apparatus of the other type aforesaid and, consequently, that characteristic renders my improved apparatus capable of effecting more inflating operations during a given time. It is characteristic of that apparatus that the fluid pressure is dispensed to the tire in surges or pulsations each of which may extend over a range of, say, fifty pounds pressure per square inch, but always above the maximum pressure of inflation of the tire for which the apparatus is set. However, my invention may be embodied in apparatus wherein during such surges, the pressure may fall below the maximum tire pressure for which the apparatus is set, but, of course, with consequent diminishment in the speed of inflation to the desired pressure, and it is to be understood that my invention may be embodied in apparatus of any of the types aforesaid.

My invention includes the various novel features of construction and arrangement hereinafter more definitely specified.

In said drawings; Fig. I is an elevation of tire inflating apparatus including valve controlling mechanism embodying my invention, and including a diagrammatic illustration of the connection thereof to a tank from which the compressed air is supplied, and to a tire which is to be inflated.

Fig. II is an elevation of part of the structure shown in Fig. I.

Fig. III is a fragmentary diametrical sectional view of the diaphragm and its appurtenances, indicated in Fig. II.

Fig. IV is a diametrical sectional view of the auxiliary safety valve and its appurtenances indicated in Fig. II.

Referring to Fig. I; tire inflating apparatus embodying my invention may include a container 1 in which air is held under high pressure, say one-hundred and fifty pounds per square inch which may be conveniently maintained by an electrically operative air compressing pump local to said container. The air is dispensed from said container 1 through the conduit 2 under control of the main valve 3 which closes in the direction of the passage of air through the valve casing 4 in which it is alternately automatically reciprocated between its opened and closed position by means of its stem 5 connected with controlling mechanism hereinafter described. Such mechanism includes the main lever 6 which is fulcrumed at 7 in the control casing 8 with its short arm 9 in cooperative relation with the axial stud 10 which has the broad head 10′ resting on the flexible diaphragm 11 and subjected to the pressure of the fluid in the diaphragm chamber 12, supplied thereto from said container 1 through the conduits 13 and 14, which communicate with the flexible dispensing hose 15. Said hose has the check valve coupling 16 for engagement with the tubular valve stem 17 mounted in the tire 18 which is to be inflated.

As above noted, the apparatus thus described is designed to be operated by the pressure of air in the diaphragm chamber 12 to close said valve 3 when the tire 18 is charged to a predetermined pressure but, if for any reason, said valve 3 fails to close, at the pressure for which the apparatus is set, the tire 18 being inflated may be destroyed by the abnormal pressure.

Therefore, an essential feature of my invention is the inclusion in the dispensing conduits of an auxiliary and safety valve 20, the function and effect of which is to positively stop the dispensation of fluid if and when the dispensed fluid applied to the diaphragm reaches a predetermined pressure, regardless of whether the main valve 3 is then shut or not and, as indicated, such safety valve is conveniently mounted in the casing 21 interposed in the dispensing conduit between the main valve 3 and said diaphragm chamber 12.

In the arrangement shown in Fig. II; the fluid pressure in the chamber 12 beneath said diaphragm 11 which is effective upon said main lever 6, is opposed by the spring 23 which is attached at one end to said lever 6 and at its other end to the spring coupling yoke 24 which couples it with one end of the similar spring 26 which extends parallel with said spring 23 and is attached at its other end to the anchor stud 27 in said casing 8. Said yoke 24 is pivoted at 29 on the nut 30 engaging the spring adjusting screw 31 which is journaled in bearings 32 and 33 in said casing 8 and provided with the crank 34 and operating handle 35 exterior to said casing whereby said screw may be turned without axial movement to shift said nut 30 axially thereon and thereby vary the stress of said springs 23 and 26 simultaneously, such stress being equalized upon the two springs by tilting movement of said yoke 24.

The arrangement above described causes said two springs 23 and 26 to function as a single spring squal to their combined length but in a casing which is smaller than would contain such a single spring, and said arrangement permits both springs to be simultaneously stressed with the minimum amount of operation of said crank 34.

The pivot pin 29 projects from the nut 30 thru the back of the casing 8 in engagement with the gear rack 36 which is mounted to slide on the back of said casing in mesh with the axial gear 37 of the rotary hand 38 which is in cooperative relation with the circular scale of graduations 39 on a dial in the casing 40; so that axial movement of said nut is manifested by turning movement of said hand 38 to indicate with reference to said scale 39 the pressure in pounds per square inch to which it is desired to inflate the tire 18 and for which the apparatus may be variably set by manual rotation of said crank 34.

Said diaphragm lever 6 which is rocked by the opposed stresses imposed on it by the diaphragm 11 and springs 23 and 26, carries a roller 41 adapted to cause said valve 3 to be snapped open and shut by means including the lever 42 which is fulcrumed on the fixed stud 43 and pivotally connected with the stem 5 of said valve. The movement of said lever 42 is limited by the stop stud 45. The cam latch 47 is pivotally connected with said lever 42 at 48, and continually stressed downward by the spring 49 which is held at its lower end on the fixed stud 46 and continually holds said link with its cam 51 engaged with said roller 41, which, as it is rocked beneath the crest of said cam, by the lever 6, lifts said latch and causes said spring 49 to snap the cam down on alternately opposite sides of said roller and thus snap said valve open and shut.

When said lever 6 is in the position shown in Fig. II, said cam 51 overhangs the roller 41 on the right hand side thereof and said valve 3 is open. However, when said lever 6 is turned clockwise by pressure of fluid in the chamber 12 beneath said diaphragm 11, said cam is snapped over said roller to the left hand side thereof by said spring 49, thus shutting said valve 3.

Although said diaphragm lever 6 is thus adapted to automatically cause said main valve 3 to be opened and shut in accordance with the pressure to which the controlling springs 23 and 26 are set by axial adjustment of said nut 30, during the use of the apparatus for inflation of ordinary automobile tires at adjustably variable pressures, less than is maintained in the container 1; the full pressure of fluid in said container may be required to inflate tires of heavy trucks. Therefore, I provide manually adjustable means to temporarily render the automatic controlling devices aforesaid inoperative, so as to permit dispensation of the full pressure of fluid from said container directly thru said hose 15. Such means includes the slide plate 53 which has the tubular bearing 54 slip fitted on said screw 31, and has the slot 55 engaging the stud 56 which is fixed in the back of said casing 8 so that said plate is thus mounted for reciprocation in said casing. Said plate 53 has, at its lower right hand corner indicated in Fig. II, the projection 57 adapted to engage the upper end of said lever 6 and shift it to open said valve 3, regardless of the pressure in the diaphragm chamber 12, if and when the nut 30 is drawn to the left hand limit of its movement on said screw 31 by manual rotation of said crank 34. Of course, reverse rotation of said screw 31 will restore the automatic controls to operative condition by shifting said projection 57 to the right away from the end of said lever 6.

As indicated in Fig. II; said safety valve 20 is adapted to be operated by said lever 6 to positively stop the dispensation of fluid therethru immediately after said lever 6 assumes the position in which said main valve 3 should be shut, regardless of whether said main valve is then shut or not. The means for effecting that result include the stud 61 which is fixed in said lever 6 and adapted to engage the upper end of the lever 62 which is fulcrumed at 63 in the bracket 64 fixed in said casing 8; which lever is engaged at its lower end in the bight 65 at the end of the plunger 66 which is mounted to reciprocate thru the stuffing box 67 in said valve casing 21 to thrust said valve 20 shut against the pressure of the fluid delivered to said casing 21 thru the conduit 13 which continually tends to open said valve 20.

As said lever 6 is subjected to fluid pressure which may aggregate as much as nine hundred pounds, and said valve 20 is small and might be damaged if subjected to that full pressure; I prefer to make the gap in said bight 65 of such extent that said lever 62 only presses said plunger 66 outwardly, away from said valve 20; movement of said plunger in the opposite direction being effected by the spring 69 which is carried by said lever 62 and resiliently bears upon said stud 61 and upon said plunger 66, so that the power transmitted from said lever 6 to shut said valve 20 is limited by the resilient stress of said spring 69. Said plunger 66 is positively moved both toward and away from said valve 20 by and between said lever 62 and spring 69, without movement of the latter relatively to said lever. Said spring 69 only bends with reference to said lever if and when the lower end of said lever is moved toward said valve after the latter has reached its seat; such yielding movement of the spring 69 being merely to then prevent deformation of said valve or its seat by excess pressure thereon. The stress of said spring 69, tending to close said valve 20, is always greater than the fluid pressure tending to open said valve; so that the latter is positively closed when said spring 69 is thrust toward said valve by the tilting movement of said lever 62 as aforesaid.

In the embodiment of my invention shown, the various parts above described are so constructed and arranged that the safety valve 20 is only thus automatically shut immediately after the condition is attained which should automatically effect the closure of the main valve 3.

In order to facilitate the operation of the apparatus above described, I prefer to provide the fluid inlet 70 from the conduit 14 to said diaphragm chamber 12 with the check valve 71 shown in Fig. III, which valve has the bleed opening 72 thru it continually affording restricted communication between said chamber 12 and said conduit 14. The effect of said check valve 71 is to maintain a higher fluid pressure in the dispensing hose 15 directly applicable to the tire 18 than would be practically feasible without it, altho the apparatus is operative as above described if the check valve is omitted and the diaphragm continually subject to the full fluid pressure in the conduits 14 and 15 without the restriction imposed by said check valve 71.

The apparatus above described operates as follows: It being desired to inflate an ordinary tire to, say, a pressure of forty pounds per square inch, the controls are set by manual rotation of the crank 34 until the hand 38 indicates, with reference to the scale 39, said desired pressure. Thereupon, the valve coupling 16 at the end of the hose 15 is applied to the tire valve stem 17 with the effect of opening both the tire valve and the check valve in said coupling, and thus affording a passageway for the compressed air from the hose 15 to the interior of the tire. Thereupon, the air trapped in the chamber 12 beneath the diaphragm 11 and in the dispensing conduits by the previous closure of the check valve in the hose coupling 16 is released into the tire, permitting the springs 23 and 26 to shift said lever 6 to the position shown in Fig. II, to open said main valve 3 against the pressure of fluid from said container 1, thus instantly dispensing fluid from said container into said tire past the safety valve 20 which is opened against the end of said plunger 66 solely by the fluid pressure. The air thus directly supplied to the tire is at a pressure considerably higher than that for which the apparatus has been set as aforesaid, but that pressure is not instantly available to shut the valve 3 by operation of the diaphragm lever 6, because of the restriction of the passageway to said diaphragm chamber 12 by the check valve 71. Consequently, the tire 18 is immediately partly inflated by a surge of air at a pressure very much higher than that for which the apparatus has been set. But the fluid pressure beneath the diaphragm 11 is thereby raised to such a degree as to close said main valve 3 by influx of said surge of pressure thru the bleed opening 72 in the diaphragm check valve 71. Thereupon, the pressure falls in the dispensing conduit as the tire inflation proceeds and, when the diaphragm 11 is thus relieved of the pressure which caused said valve 3 to be shut, it is again opened automatically to dispense another similar surge of air at high pressure. Said main valve 3 is thus oscillated back and forth from open to closed position with according dispensation of air in surges at an average pressure very much in excess of that for which the apparatus has been set, to thus hasten the operation of inflating the tire to that predetermined pressure, and such pulsatory operation is, of course, in part due to the restriction of the flow of air from the hose 15 to the tire 18 thru the tire valve passageway which is small and tortuous because it is, in part, obstructed by the tire valve stem and spring.

When, however, said predetermined pressure is attained in the tire 18, the inflation operation is automatically terminated, by the consequent pressure upon said diaphragm 11. However, as the compressed air in the container 1 is drawn from the outer atmosphere, it may include particles of dust or other matter which, if lodged upon the seat of said valve 3 in the casing 4, would prevent said valve from stopping the flow of compressed air to the tire, and the latter might be destroyed by excess pressure. Altho I prefer to include in connection with said casing 4, an air screening device 4' thru which the air is filtered before it reaches the valve, it is found in practice that such screening devices do not always prevent the passage of material which would prevent said valve from seating. However, if for any reason said valve 3 fails to close when the pressure in the chamber 12 is such that it should close; the safety valve 20 is immediately closed by the pressure of said spring 69 upon the plunger 66 which is thereby thrust to the left in Fig. II, against said valve 20, and the dispensation of air thus positively terminated, regardless of the position of said valve 3.

When it is desired to inflate an extraordinary tire, such as is used on heavy trucks, as above contemplated; said crank 34 may be manipulated to thrust said nut 30 against the slip bearing 54 thus shifting said plate 53 to the left in Fig. II and forcing said lever 6 into position to open said valve 3, regardless of the pressure in said diaphragm chamber 12 which ordinarily controls the operation of said lever 6. Such abnormal adjustment thus temporarily throws the automatic controlling mechanism above described out of operation to permit the operator to apply the maximum pressure from the container 1 directly to such abnormal tire by connection of the valve coupling 16 with the valve stem of such tire.

Altho it is convenient to thus cooperatively connect the means for temporarily suspending the operation of the automatic controlling devices aforesaid with the means for manually predetermining the pressure to be attained; such means may be otherwise constructed and arranged. Moreover, altho I find it convenient to combine with a main valve adapted to normally automatically control the dispensation of a fluid, a safety valve adapted to function to stop such dispensation if and when the main valve fails to function, as above described; it is to be understood that a suitable safety valve adapted for that purpose may be otherwise constructed and arranged.

Moreover, I prefer to provide said apparatus with signaling means, preferably audible, adapted to manifest when each dispensing operation is completed. For instance, said lever 42 may be provided with the pin 75 projecting thru the back of said casing 8, in position to knock the upper end of the bell crank lever 76 which is fulcrumed at 77 on said casing and normally gravitates to the position indicated in full lines in Fig. I but, when thus knocked, is caused to strike, with its opposite end, the gong 78 which is mounted on the standard 79 projecting rigidly from the back of said casing. However, other signaling means may be employed.

Therefore, I do not desire to limit myself to the precise details of construction and arrangement herein set forth, as it is obvious that various modifications may be made therein without departing from the essential features of my invention, as defined in the appended claims.

I claim:

1. In fluid dispensing apparatus, the combination with means adapted to supply fluid at high pressure; of a main valve adapted to control the dispensation of fluid from said supply; means automatically adjustable, by the pressure of the fluid dispensed, to normally automatically effect opening and closing movements of said valve when a predetermined pressure of the fluid dispensed is attained; and a safety valve, operatively connected with said adjustable means, adapted to positively stop the dispensation of fluid if and when said main valve fails to function; wherein the safety valve is adapted to be normally opened by the pressure of the fluid dispensed and adapted to be automatically closed against the pressure of that fluid at said safety valve.

2. Apparatus as in claim 1; wherein the main valve and safety valve are cooperatively connected to the same controlling element.

3. Apparatus as in claim 1; wherein the main valve and safety valve are cooperatively connected to the same controlling element, and the latter is a lever operatively connected with a diaphragm subjected to the pressure of the fluid being dispensed.

4. Apparatus as in claim 1, adapted to automatically open and shut said main valve repeatedly during a single dispensing operation and thereby dispense the fluid in a succession of surges under pressure which varies from maximum to minimum during each such surge.

5. Apparatus as in claim 1, adapted to automatically open and shut said main valve repeatedly during a single dispensing operation and thereby dispense the fluid in a succession of surges under pressure which varies from maximum to minimum during each such surge, and means manually adjustable to variably predetermine a pressure of the dispensed fluid at which said dispensation shall be stopped.

6. Apparatus as in claim 1, adapted to automatically open and shut said main valve repeatedly during a single dispensing operation and thereby dispense the fluid in a succession of surges under pressure which varies from maximum to minimum during each such surge, and means manually adjustable to variably predetermine a pressure of the dispensed fluid at which said dispensation shall be stopped, including a valve operating lever, a spring operatively connected with said lever, means manually adjustable to vary the effective stress of said spring with respect to said lever; and a rotary indicator in cooperative relation with said spring adjusting means and movable in accordance with the movement of said adjusting means.

7. In fluid dispensing apparatus, the combination with a valve adapted to control such dispensation; of means for operating said valve including a diaphragm subjected to fluid pressure upon the discharge side of said valve; means operatively connecting said diaphragm with said valve, to close the latter, including a yielding member incapable of yielding except under excessive stress imparted from said operating means, after said valve is closed; whereby damage to said valve and its seat by such excessive stress is avoided.

8. The combination with an air service line having a valve controlled portion and means for discharging air in successive charges when said valve is opened comprising a control valve in the air service line; a lever, means for subjecting the lever to pressure in the air service line between said valve controlled portion and said control valve and to the pressure from the outlet side of said control valve and an independent mechanism actuated from the lever for actuating said control valve, of a safety valve in said air service line and a direct connection between said lever and said safety valve for positively actuating the same to closed position in case of said lever being subjected to excessive pressure.

9. In an air service device for filling a receiver to a predetermined amount of air pressure, an air service line, pressure responsive means, a control valve controlling said air service line; said pressure responsive means being subject to pressure from the outlet side of said control valve, snap action means operable by said pressure responsive means for successively opening said control valve for permitting charges of air to pass to said receiver and a safety controlling valve controlling the flow of air to said device and normally operable to open position by said pressure responsive means, said safety valve being positively closed by said pressure responsive means in case of the presence of excessive pressure applied thereon and said valves being operable independently of each other for closing movement.

JOSEPH C. WOODFORD.